US006614494B2

(12) United States Patent
Kawai et al.

(10) Patent No.: US 6,614,494 B2
(45) Date of Patent: Sep. 2, 2003

(54) REPAIRABLE THIN FILM TRANSISTOR MATRIX SUBSTRATE AND METHOD OF REPAIRING THE SUBSTRATE

(75) Inventors: Satoru Kawai, Yonago (JP); Kiyoshi Ozaki, Kawasaki (JP); Jun Inoue, Kawasaki (JP); Yoshio Dejima, Kawasaki (JP); Kenji Okamoto, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 0 days.

(21) Appl. No.: 09/861,796

(22) Filed: May 21, 2001

(65) Prior Publication Data

US 2001/0022366 A1 Sep. 20, 2001

Related U.S. Application Data

(62) Division of application No. 09/010,688, filed on Jan. 22, 1998, now Pat. No. 6,259,494.

(30) Foreign Application Priority Data

Jan. 31, 1997 (JP) ............................................. 9-019285
May 19, 1997 (JP) ............................................. 9-128733
Dec. 8, 1997 (JP) ............................................. 9-337550

(51) Int. Cl.⁷ .......................................... G02F 1/1343
(52) U.S. Cl. ........................... 349/54; 349/39; 349/192; 349/55
(58) Field of Search ........................... 349/192, 39, 54, 349/55

(56) References Cited

U.S. PATENT DOCUMENTS

| 4,688,896 A | 8/1987 | Castleberry |
| 4,840,459 A | 6/1989 | Strong |
| 5,062,690 A | * 11/1991 | Whetten ...................... 257/59 |

(List continued on next page.)

FOREIGN PATENT DOCUMENTS

| JP | 55896 | 1/1993 |
| JP | 519294 | 1/1993 |
| JP | 5100237 | 4/1993 |
| JP | 828519 | 3/1996 |
| JP | 8110527 | 4/1996 |
| JP | 8160467 | 6/1996 |

*Primary Examiner*—Kenneth Parker
(74) *Attorney, Agent, or Firm*—Greer, Burns & Crain, Ltd.

(57) ABSTRACT

A repairable integrated thin film transistor matrix substrate includes an insulated substrate, and a plurality of parallel gate bus lines and a plurality of accumulated capacitance bus lines formed on the insulated substrate. Each of the accumulated capacitance bus lines extend parallel to and between a pair of the gate bus lines, and has a plurality of auxiliary capacitance electrodes which extend from it. A first insulated film is provided on the gate and accumulated capacitance bus lines and the auxiliary capacitance electrodes. A plurality of operating films are formed on the first insulated film, and on each of the operating films, a corresponding thin film transistors are provided. At least two of the thin film transistors are electrically connected to each of the gate bus lines. Also included is a plurality of parallel drain bus lines which are provided substantially perpendicular to the gate and the accumulated capacitance bus lines on the first insulated film. Each drain bus line electrically connects at least two of the thin film transistors. In addition, a second insulated film having an opening over each of the thin film transistors is provided on the thin film transistors and the drain bus lines. Further, a plurality of pixel electrodes are provided on the second insulated film, which pixel electrodes being electrically connected to a corresponding one of the transistors via the opening. At least one first portion of at least one of the gate and the drain bus lines overlaps with at least one second portion of at least one of the auxiliary capacitance and the pixel electrodes. A method for repairing the matrix substrate generally includes electrically connecting a conductor to either sides of a defect to act as a bypass.

6 Claims, 18 Drawing Sheets

U.S. PATENT DOCUMENTS

| | | | |
|---|---|---|---|
| 5,075,674 A | * 12/1991 | Katayama et al. | 345/206 |
| 5,260,818 A | * 11/1993 | Wu | 349/55 |
| 5,303,074 A | * 4/1994 | Salisbury | 349/55 |
| 5,337,173 A | * 8/1994 | Atsumi et al. | 349/39 |
| 5,392,143 A | * 2/1995 | Akiyama et al. | 349/39 |
| 5,517,341 A | * 5/1996 | Kim et al. | 349/42 |
| 5,691,786 A | 11/1997 | Nakai | |
| 5,767,927 A | 6/1998 | Jang | |
| 5,822,027 A | 10/1998 | Shimada et al. | |
| 5,825,438 A | * 10/1998 | Song et al. | 349/54 |
| 5,852,482 A | * 12/1998 | Kim | 349/46 |
| 5,943,106 A | 8/1999 | Sukenori et al. | |
| 5,965,906 A | * 10/1999 | Park | 257/72 |

* cited by examiner

REPAIRABLE THIN FILM TRANSISTOR MATRIX SUBSTRATE AND METHOD OF REPAIRING THE SUBSTRATE

This Application is a divisional of Ser. No. 09/010,688, filed on Jan. 22, 1998, now U.S. Pat No. 6,259,494.

The present invention relates to a thin film transistor matrix substrate for driving a liquid crystal display, and more particularly, to a thin film transistor matrix substrate having electrodes for repairing bus line disconnections and interlayer short-circuits, and to a method for repairing such thin film transistor matrix substrates.

BACKGROUND OF THE INVENTION

A conventional thin film transistor matrix substrate is described herein with reference to FIGS. 14A and 14B. FIG. 14A shows a plan view of a portion of a conventional TFT matrix substrate 100 including a plurality of gate bus lines 101 (two shown) extending in a lateral direction or X-direction and a plurality of drain bus lines 103 (two shown) extending in a vertical direction or Y-direction. These bus lines 101, 103 are formed on a transparent substrate 100A. In the areas where the gate and drain bus lines 101, 103 cross, the bus lines are electrically insulated from each other by an insulated film (not shown). An accumulated capacitance bus line 102 is provided between each pair of adjacent gate bus lines 101 so that it extends substantially parallel to the gate bus lines 101. A constant ground potential, for example, is applied to the accumulated capacitance bus lines 102. The accumulated capacitance and the drain bus lines 102, 103 are also insulated from each other by an insulation film (not shown) in the areas where they cross.

A thin film transistor (TFT) 104 is formed approximately at each crossing point of the gate and the drain bus lines 101, 103, and includes a drain electrode 104D, a source electrode 104S and a gate electrode (not shown). The drain electrodes 104D of the TFTS 104 in a single column are all connected to a corresponding drain bus line 103, and the gate electrodes (not shown) are connected to a corresponding gate bus line, which in effect, work as the gate electrodes. A pixel electrode 105 (shown in dotted lines) corresponding to each TFT 104 is arranged in a generally rectangular region surrounded by the corresponding gate and drain bus lines 101, 103, and is connected to the source electrode 104S via an opening 107 though an insulated film (not shown) between the pixel electrode 105 and the TFT 104.

The TFT matrix substrate 100 also includes a pair of auxiliary capacitance electrodes 106 which extend from each of the accumulated capacitance bus lines 102 between each pair of drain bus lines 103. Each of the auxiliary capacitance electrodes 106 extends outwardly in the opposite vertical directions, i.e., in the positive and negative Y-directions, near the corresponding pair of gate bus lines 101. The pair of auxiliary capacitance electrodes 106 are arranged so that each is adjacent and generally parallel to one of the pair of the corresponding drain bus line 103 and partially overlaps with one side of the pixel electrode 106. A liquid crystal material (not shown) is held between two common electrode substrates (not shown) which are also provided on the TFT substrate matrix substrate 100. In this manner, an auxiliary capacitance $C_s$ (best seen in FIG. 14B) is formed between the accumulated capacitance bus line 102 and the pixel electrode 105.

FIG. 14B is an electrical circuit equivalent of the TFT matrix substrate 100 of FIG. 14A, and shows that a liquid crystal capacitance $C_{LC}$ is formed between the pixel electrode 105 and the accumulated capacitance electrode 102, and the auxiliary capacitance $C_S$ is formed in parallel with the liquid crystal capacitance $C_{LC}$. Moreover, a floating capacitance $C_{NS}$ is formed between the pixel electrode 105 and drain bus line 103.

When the TFT 104 is not conductive, as when a particular display pixel of the liquid crystal display is not selected, the potential of the corresponding drain bus line 103 changes significantly. As a result, the potential of the relevant pixel electrode 105 also changes, due to the capacitance coupling by the floating capacitance $C_{NS}$. The resulting voltage variation $\Delta V$ in the pixel electrode 105 is expressed as follow:

$$\Delta V = C_{NS}/(C_{NS}+C_{LC}+C_S) \qquad (1)$$

The potential variation creates an unwanted gradient of brightness along the scanning direction (direction parallel to the drain bus lines 103) of the display pixels, and crosstalk (uneven brightness), depending on the display pattern.

In the TFT matrix substrate 100 shown in FIG. 14A, the accumulated capacitance bus lines 102 and auxiliary capacitance electrode 106 are provided to increase the auxiliary capacitance electrode $C_S$, thereby reducing the negative influence of the voltage variation of the drain bus lines 103 and enhancing the display quality. In other words, the voltage variation is reduced by inserting the auxiliary capacitance $C_S$ in parallel with the liquid crystal capacitance $C_{LC}$ (best seen in FIG. 14B).

As shown in FIG. 14A, the auxiliary electrode capacitances 106 are arranged adjacent the drain bus lines 103 to obtain a large aperture ratio. However, this arrangement at times results in the auxiliary capacitance electrode 106 and drain bus lines 103 being short-circuited, due, for example, to a defective insulated film between these elements or because of alignment errors of patterns of the auxiliary capacitance electrodes 106 and the drain bus lines 103. Further, a short-circuit may also occur between the drain and the gate bus lines 103, 101, and between the drain bus lines and the accumulated capacitance bus lines 102. Moreover, disconnections or cuts on the bus lines 101, 102, 103 may also occur as a result of dust or foreign matters generated during the formation of the electrode and the bus patterns or as a result of a flawed mask, etc.

If the above-described interlayer short-circuits or disconnections of bus lines are generated even at one point, the entire TFT matrix substrate could be considered defective. Therefore, the ability to repair such faults during the manufacturing stage is important in improving manufacturing yield.

A known method of repairing the short-circuits or the disconnections described above is explained with reference to FIG. 15, which shows a schematic plan view of the conventional TFT matrix substrate 100. The TFTs 104 and the pixel electrodes 105 are arranged in the form of a matrix, and a plurality of backup lines 108, 109 (only one each shown in FIG. 15) are arranged in the upper and lower peripheral areas.

In operation, if a disconnection Bo occurs on the drain bus line 103, a repair is performed by connecting both the backup lines 108, 109, which are electrically connected to an external circuit, to the disconnected drain bus lines 103 at two disconnection repairing points Wo and Woo, respectively. In this manner, the backup lines 108, 109 carry the signals which otherwise would have been carried by the disconnected drain bus line 103. The connections at the repairing points Wo and Woo is made by dissolving the insulated and the metal films with irradiation of a laser beam.

One disadvantage of the above-described repair method is that noise is superimposed onto the backup lines 108, 109 due to capacitance coupling, which arises as a result of the backup lines 108, 109 crossing the drain bus lines 103 and being separated from the drain bus lines by an insulated film. To reduce the effect of such noise, the resistance of the backup bus lines 108, 109 could be lowered, which would require widening the width of the bus lines. However, an increase in the width of the bus lines in turn results in an increase in the probability of interlayer short-circuits between the backup lines 108, 109 and the drain bus lines 103, thereby creating conditions in which additional defects may occur.

Moreover, the location where the repair is performed is relatively distant from where the actual defect is located, and therefore, a highly accurate and expensive apparatus for removing the substrate is required for the repair.

Further, the backup lines 108, 109 increase the complexity of the TFT matrix substrate and require extra considerations for eliminating noise caused by the backup lines.

In addition, if the number of disconnections or short-circuits generated in the drain bus lines exceeds the number of backup lines, and if the disconnections or the short-circuits are detected in a plurality of pixels along a single drain bus line 103, a complete repair cannot be made.

Therefore, it is one object of the present invention to provide a TFT transistor matrix substrate which can easily repair a defect in the matrix substrate as a result of short-circuits between the drain bus lines and auxiliary capacitance electrodes, disconnection of the drain bus lines, short-circuit between the drain and the gate bus lines or disconnections of the gate bus lines.

Another object of the present invention is to provide a TFT transistor matrix substrate which makes it easier for an automatic repairing apparatus to locate and repair the defects.

SUMMARY OF THE INVENTION

In keeping with a first aspect of this invention, a repairable integrated thin film transistor matrix substrate includes an insulated substrate, and a plurality of parallel gate bus lines and a plurality of accumulated capacitance bus lines formed on the insulated substrate. Each of the accumulated capacitance bus lines extend parallel to and between a pair of the gate bus lines, and has a plurality of auxiliary capacitance electrodes which extend from it. A first insulated film is provided on the gate and accumulated capacitance bus lines and the auxiliary capacitance electrodes.

A plurality of operating films are formed on the first insulated film, and on each of the operating films, corresponding thin film transistors are provided. At least two of the thin film transistors are electrically connected to each of the gate bus lines. Also included is a plurality of parallel drain bus lines which are provided substantially perpendicular to the gate and the accumulated capacitance bus lines on the first insulated film. Each drain bus line electrically connects at least two of the thin film transistors.

In addition, a second insulated film having an opening over each of the thin film transistors is provided on the thin film transistors and the drain bus lines. Further, a plurality of pixel electrodes are provided on the second insulated film, which pixel electrodes are electrically connected to a corresponding one of the transistors via the opening. At least one first portion of at least one of the gate and the drain bus lines overlaps with at least one second portion of at least one of the auxiliary capacitance and the pixel electrodes.

In keeping with a second aspect of this invention, a repairable integrated thin film transistor matrix substrate includes the features described above with respect to the first aspect, with the exception of the feature of the first portion overlapping with the second portion. Additionally, the matrix substrate further includes at least one conductive layer formed on the second insulated film at at least one crossing region where the drain bus lines cross the gate and the accumulated capacitance bus lines.

In keeping with a third aspect of this invention, a repairable integrated thin film transistor matrix substrate includes the features described above with respect to the first aspect, with the exception of the feature of the first portion overlapping with the second portion. Additionally, the matrix substrate further includes one end of at least one of the plurality of auxiliary capacitance electrodes extending across one of the drain bus lines and overlapping with a portion of a selected adjacent pixel electrode to create a first overlapping region.

One method for repairing the repairable integrated thin film transistor matrix substrate described above requires overlapping a first portion on one side of a first defect on a selected one of the gate bus lines and the drain bus lines with a first part of a conductor to create a first overlapping region, and a second portion on the other side of the first defect with a second part of the conductor to create a second overlapping region. Then, the first portion is electrically connected to the first part at the first overlapping region, and the second portion is electrically connected to the second area at the second overlapping region. In this way, the conductor creates an electrical bypass around the first defect.

DETAILED DESCRIPTION

Figure 1:
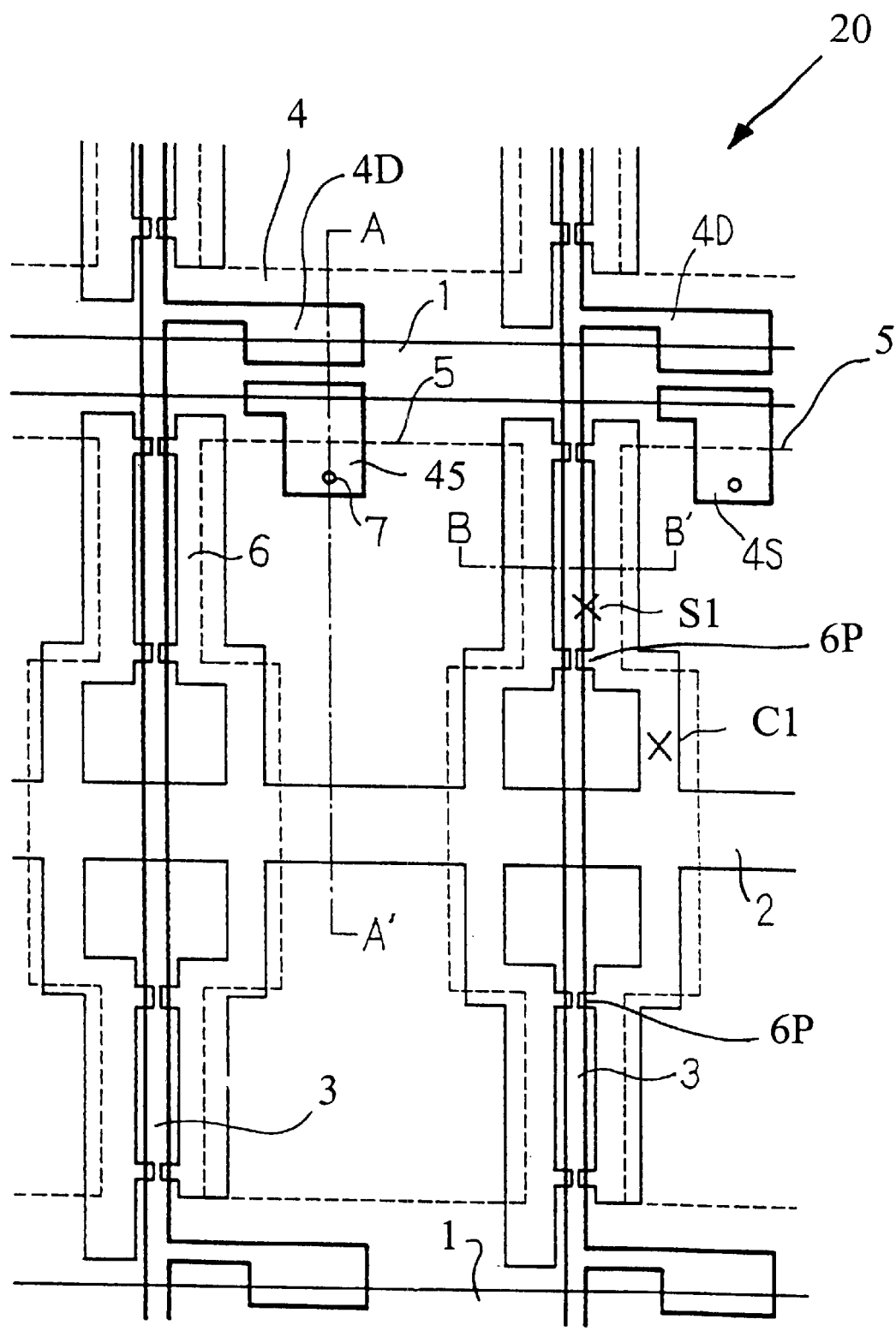
FIG. 1 is a plan view of the thin film transistor matrix substrate according to the first embodiment of the present invention.
Figure 2A:
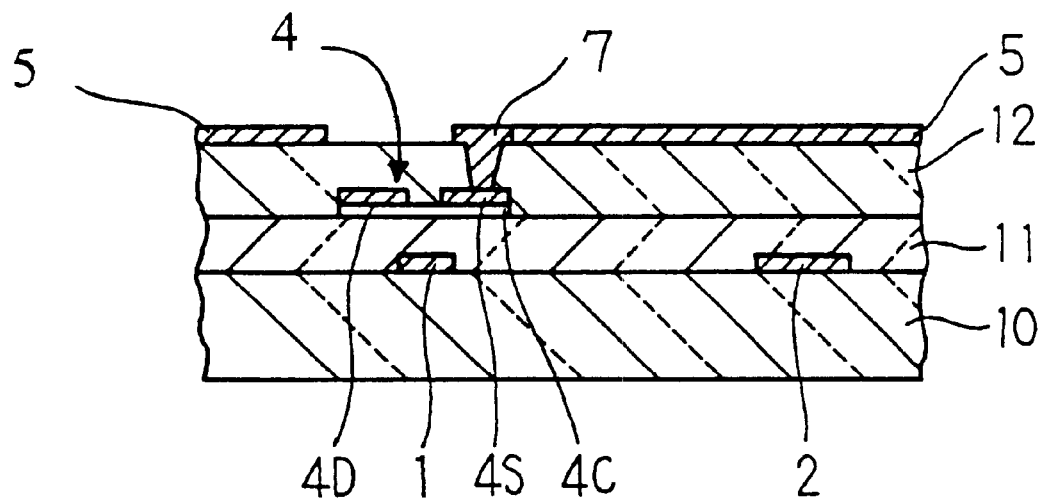
FIG. 2A is a cross-section of line A–A' of FIG. 1.
Figure 2B:
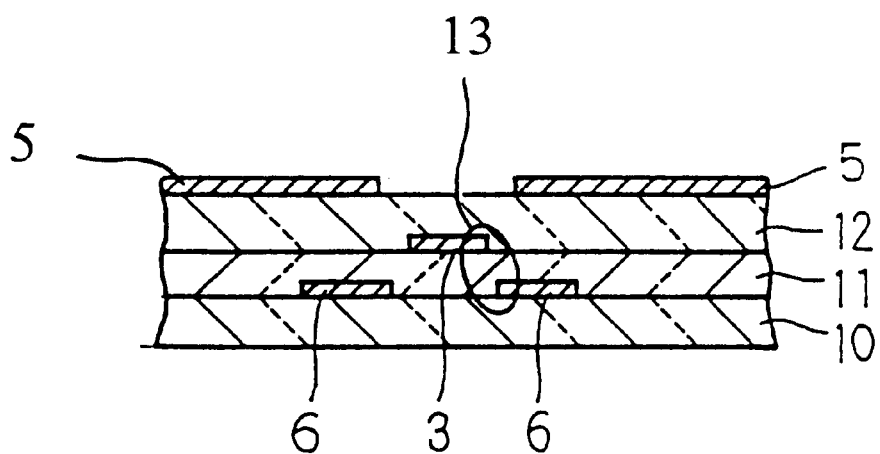
FIG. 2B is a cross-section of line B–B' of FIG. 1.

As seen in FIGS. 1, 2A and 2B, a thin film transistor (TFT) matrix substrate 20 of the present invention includes a plurality of parallel gate bus lines 1 extending generally in a lateral direction, i.e., in the X-direction, and a plurality of accumulated capacitance bus lines 2 (only one shown) arranged parallel to and between a pair of the gate bus lines 1. The gate bus lines 1 and accumulated capacitance bus lines 2 are covered with a gate insulated film 11 (best seen in FIG. 2A). A plurality of parallel drain bus lines 3 are provided on the insulated film 11, and extend across the gate and the accumulated bus lines 1, 3 in a generally perpendicular direction, i.e., in the Y-direction. A thin film transistor (TFT) 4 is formed approximately at each crossing point of the gate and the drain bus lines 1, 3 and includes a drain electrode 4D, a source electrode 4S and a gate electrode (not shown). The drain electrodes 4D are connected to the corresponding drain bus lines 3, and the gate bus lines 1 are connected to the corresponding gate electrodes (not shown) and, in effect, work as the gate electrodes.

The drain bus lines 3 and the TFTS 4 are covered with an interlayer insulated film 12 (best seen in FIG. 2B), on which a plurality of pixel electrodes 5 (shown in dotted lines) corresponding to each TFT 4 are formed. Each pixel electrode 5 is arranged in a generally rectangular region surrounded by the corresponding gate and drain bus lines 1, 3, and is connected to the source electrode 4S of the corresponding TFT via a contact hole 7 through the interlayer insulated film 12.

The TFT matrix substrate 20 also includes a pair of auxiliary capacitance electrodes 6 which extend from the accumulated capacitance bus line 2 between each pair of the drain bus lines 3. Each of the auxiliary capacitance electrodes 6 extends outwardly in the opposite vertical directions, i.e., in the positive and negative Y-directions, near to the corresponding pair of gate bus lines 1. In this manner, the pair of auxiliary capacitance electrodes 6 are arranged so that each auxiliary capacitance electrode is adjacent and generally parallel to one of the pair of corresponding drain bus line 3 and to one side of the corresponding pixel electrode 5. In accordance with the first embodiment, the auxiliary capacitance electrodes 6 has at least one protruded portion 6P (four shown on each auxiliary capacitance electrode in FIG. 1) which overlaps with the drain bus line 3.

In the preferred embodiment, the interval between two adjacent drain bus lines 3 is about 80 $\mu$m, the width of the drain bus lines is approximately 10 $\mu$m, and the narrowest interval between the auxiliary capacitance electrode 6 and drain bus line 3 is approximately 1 $\mu$m. Also, the width of the auxiliary capacitance electrodes 6 is about 6 $\mu$m and length thereof is about 90 $\mu$m. The length of the protruded portions 6P provided on the auxiliary capacitance electrodes 6 is approximately 4 $\mu$m and the width is approximately 3 $\mu$m. Moreover, the interval of two adjacent gate bus lines 1 is about 256 $\mu$m and width of the accumulated capacitance bus lines 2 is approximately 20 $\mu$m.

FIG. 2A shows a sectional view of line A–A' of the TFT matrix substrate 20 of FIG. 1, including the gate bus line 1 and the accumulated capacitance bus line 2 formed on a glass substrate 10. The gate bus line 1 and accumulated capacitance bus line 2 consist preferably of chromium (Cr), and can be formed, for example, by depositing a Cr film on the entire region of the glass substrate 10 by a sputtering method and then patterning the Cr film. Patterning of the Cr film enables simultaneous formation of the auxiliary capacitance electrodes 6, which are also provided on the glass substrate 10 (best seen in 2B).

The gate insulated film 11 covering the gate and the accumulated capacitance bus lines 1, 2 consists preferably of SiN and has a thickness of about 400 nm. It is formed, for example, by a plasma exciting type chemical vapor deposition (PE-CVD) method. An amorphous silicon film 4C having a thickness of about 150 nm is formed on the surface of the gate insulated film 11 over each of the area where each of the TFTs 4 are to be formed, i.e., approximately at the crossing points of the drain and the gate bus lines. The source and the drain electrodes 4S, 4D, which have the three-layer structure of Ti/Al/Ti, are formed on the silicon film 4C. The lower Ti layer is about 20 nm, the Al layer about 50 nm and the upper Ti layer about 80 nm. The source and the drain electrodes 4S, 4D are formed simultaneously with the drain bus lines 3, which are also formed on the gate insulated film 11 (best seen in FIGS. 1 and 2B). The amorphous silicon film 4C is deposited by the PE-CVD method using, for example, SiH4 as the raw material gas, and the patterning is executed through the etching method using plasma asher with the resist pattern used as a mask. The Ti layer and the Al layers are deposited by the sputtering method, and the patterning is also executed by the etching method using the wet process with the resist pattern used as a mask.

Figure 14A:
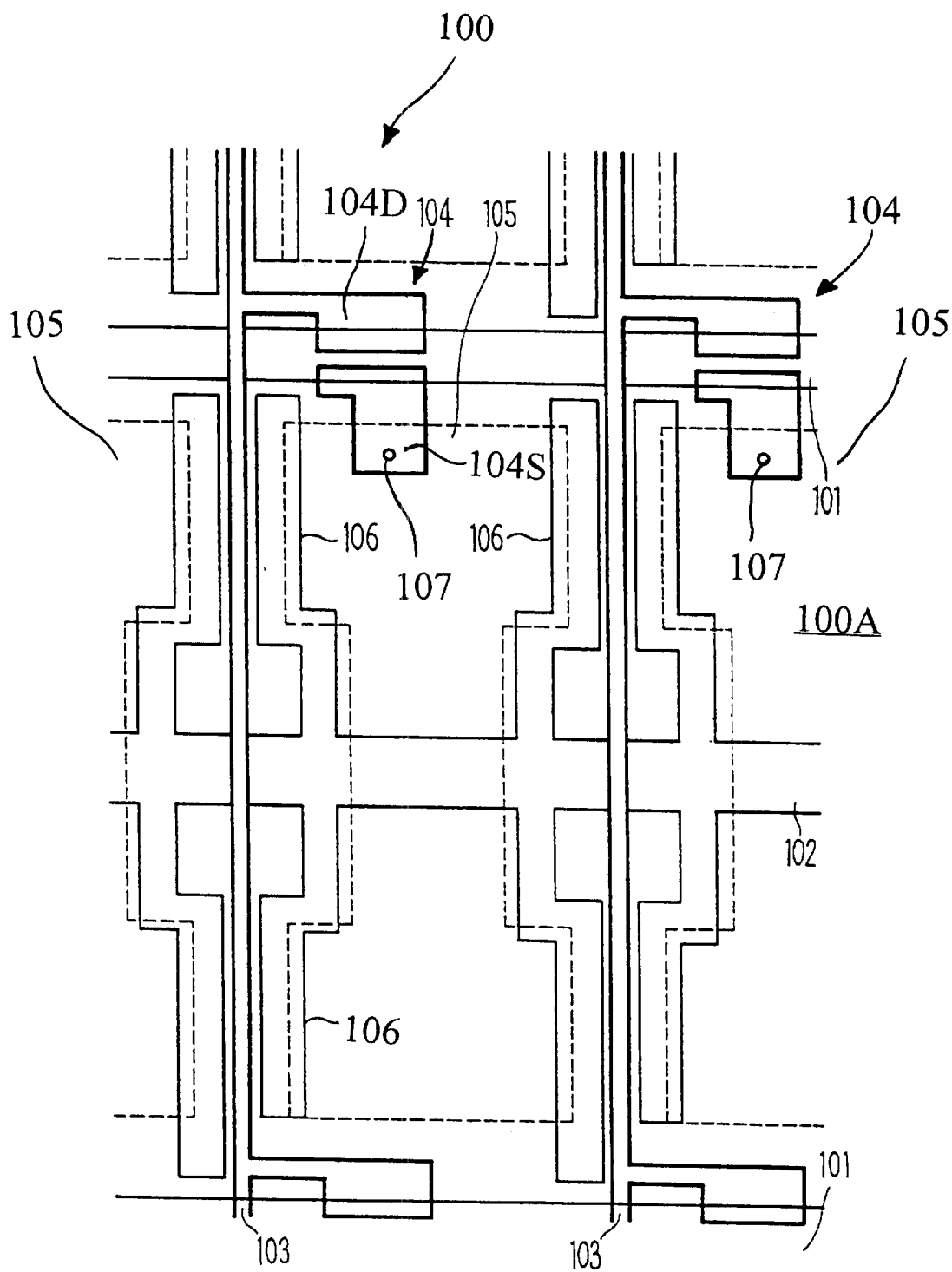
FIG. 14A is a plan view of a conventional thin film transistor matrix substrate.
Figure 14B:
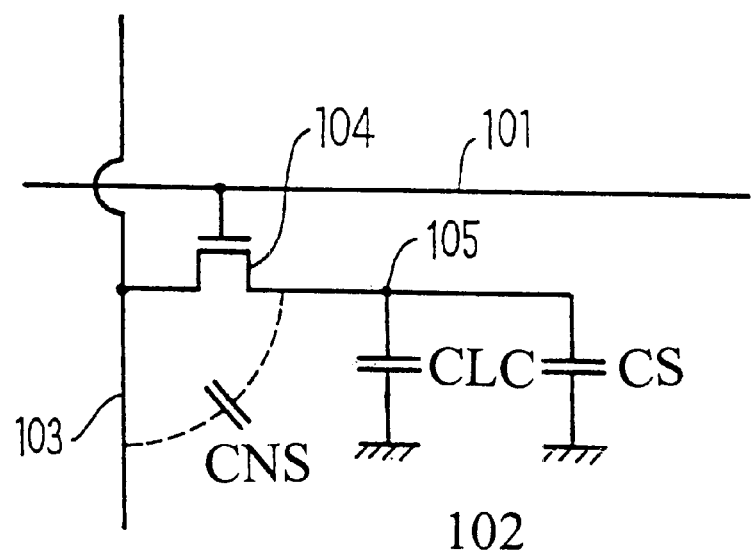
FIG. 14B is circuit equivalent of the conventional thin film transistor matrix substrate of FIG. 14A.
Figure 15:
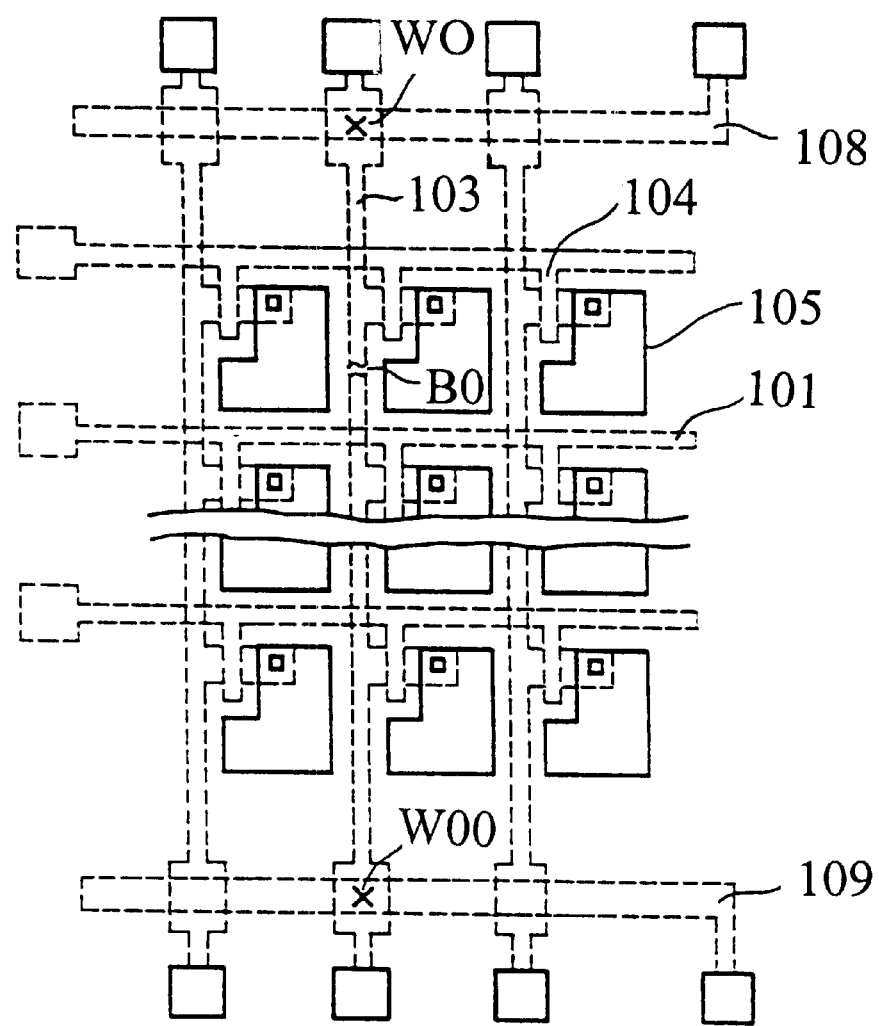
FIG. 15 is a diagram showing a conventional method for repairing a disconnection in the thin film transistor matrix substrate.

The interlayer insulated film 12 has a thickness of about 30 $\mu$m, and is formed on the gate insulated film to cover the TFTS 4. It preferably consists of Ni, and can also be formed, for example, by the PE-CVD method. A plurality of transparent pixel electrodes 5 partial views of two pixel electrodes are shown in FIG. 2A) consisting of indium tin oxide (ITO) are formed on the surface of the interlayer insulated film 12. The pixel electrodes 5 are formed, for example, by depositing the ITO film by sputtering and then patterning the ITO film. Each pixel electrode 5 is connected to the source electrode 4S of the corresponding TFT 4 via the contact hole 7 formed through the interlayer insulating film 12. As shown in FIG. 1, the sides of the pixel electrodes 5 partially overlap with the auxiliary capacitance electrodes 6. As a result, the auxiliary capacitance $C_S$ shown in FIG. 14B is generated by the overlapping areas between the accumulated capacitance bus line 2, the auxiliary capacitance electrode 6 and the pixel electrode 5.

FIG. 2B shows a sectional view along line B–B' of the TFT matrix substrate 20 of FIG. 1, including the auxiliary capacitance electrodes 6 arranged on the transparent substrate 10 and covered with the gate insulated film 11. The drain bus line 3 is arranged on the gate insulated film 11 between the two auxiliary capacitance electrodes 6 and covered with the interlayer insulated film 12, on which the pixel electrodes 5 (partial view of two pixel electrodes shown) are arranged as discussed above.

As shown by an area indicated by an ellipse 13, the gate insulated film 11 between the drain bus line 3 and the auxiliary capacitance electrodes 6 is relatively thin. As such, a potential for an interlayer short-circuit occurring at this area is greater than at other areas. In accordance with one repair method of the invention, when a short-circuit does occur between the auxiliary capacitance electrodes 6 and drain bus line 3, it is enough to merely cut the auxiliary capacitance electrode 6 with a laser beam between the location of the short and the accumulated capacitance bus line 2 to effect a repair. For instance, if a short-circuit occurs at the point $S_1$ in FIG. 1, the auxiliary capacitance electrode 6 is cut at the corresponding cutting point $C_1$ with a laser beam to electrically disconnect it from the accumulated capacitance bus line 2. Preferably, the laser beam is produced from a YAG laser and has a wavelength of 1064 nm, intensity of 0.53 MW, and beam spot size of about 2 to 10 $\mu m\emptyset$.

In the above-described repair method, since it is not required to use the backup lines for repairs, as in the conventional repair method, additional space on the matrix substrate is not required for the backup lines. Moreover, even if a short-circuit is generated in more than one location along a single drain bus line, the repair is still possible.

Figure 3:
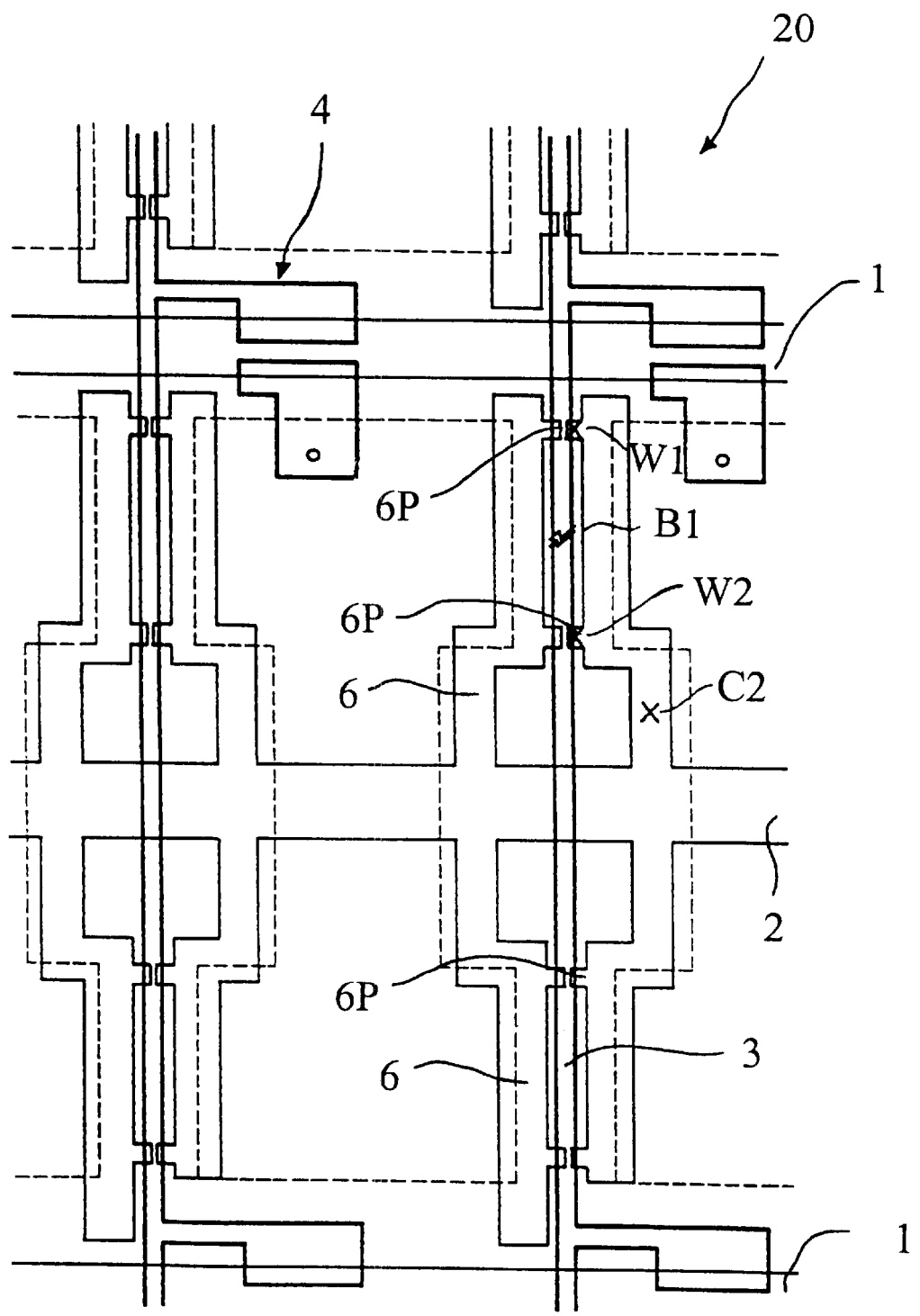
FIG. 3 is a diagram showing a method for repairing a disconnection in the thin film transistor matrix substrate of FIG. 1.

FIG. 3 shows the TFT matrix substrate 20 of FIG. 1, with a disconnection or cut $B_1$ located on the drain bus line 3 between the two overlapping regions $W_1$, $W_2$ created by the two protruded portions 6P. In this case, a repair of the of the drain bus line 3 is made by irradiating the overlapping regions $W_1$, $W_2$ with a laser beam to electrically connect the drain bus line 3 with the protruded portions 6P. Then, the auxiliary capacitance electrode 6 is cut, preferably with a laser beam, at point $C_2$ near the accumulated capacitance bus line 2. In this manner, the auxiliary capacitance electrode 6 is electrically disconnected from the accumulated capacitance bus line 2 and is used effectively as a bypass for the drain bus line 3 around the disconnection $B_1$.

Figure 4A:
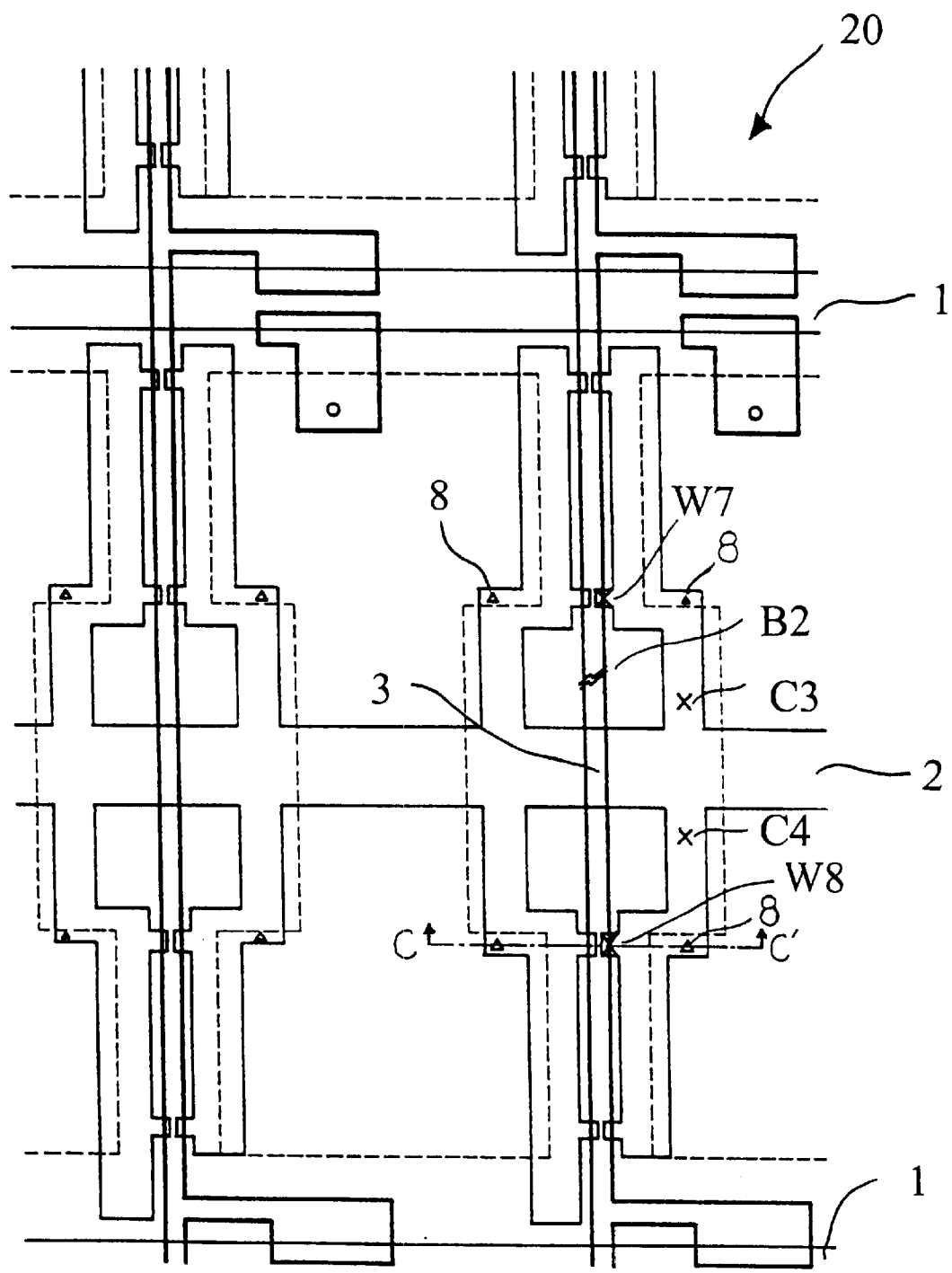
FIG. 4A is a plan view of the thin film transistor matrix substrate according to the second embodiment of the present invention.
Figure 4B:
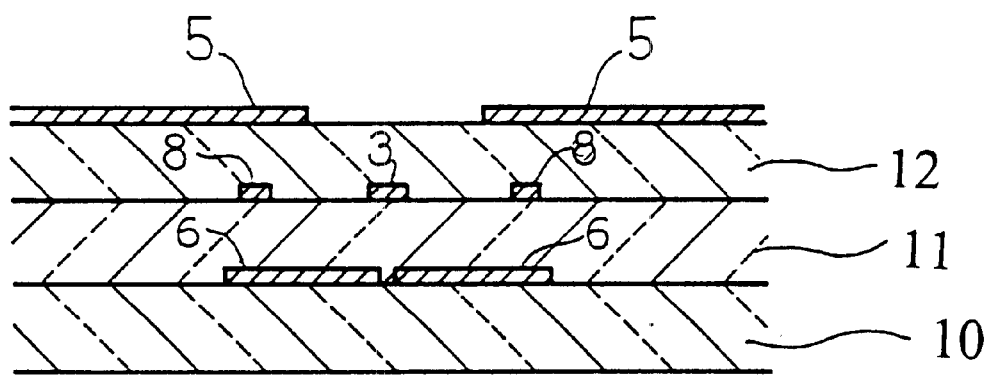
FIG. 4B is a cross section of line C–C' of FIG. 4A.

Referring to FIGS. 4A and 4B, the TFT matrix substrate 20 according to the second embodiment of the present invention includes land type conductive layers 8 formed on the gate insulated film 11 (best seen in FIG. 4B), in addition to the features described with respect the first embodiment and shown in FIGS. 1, 2A and 2B. The conductive layers 8 are formed simultaneously with the drain bus line 3 and are located in the region where there is a partial overlapping between the auxiliary capacitance electrode 6 and pixel electrode 5. The purpose of the conductive layers 8 is to assist in the connection between the auxiliary capacitance electrode 6 and pixel electrode 5 when the connection is realized by irradiation of a laser beam. Additionally, the surface shape of this land type conductive layer 8 makes it easier for an automatic repairing apparatus to recognize the laser irradiating locations.

In accordance with another repair method of the invention, if a disconnection $B_2$ is generated on the drain bus line 3 between two overlapping regions $W_7$, $W_8$ created by the protruded portions 6P, the drain bus line 3 and the auxiliary capacitance electrode 6 are electrically connected at the overlapping regions $W_7$, $W_8$ by irradiating a laser beam at those regions. The auxiliary capacitance electrode 6 and the pixel electrode 5 are also electrically connected by irradiation of a laser beam where the land type conductive layers 8 are located. Then, the auxiliary capacitance electrode 6 is cut at the two points $C_3$, $C_4$ near the accumulated capacitance bus line 2 to electrically disconnect the auxiliary capacitance electrode from the accumulated capacitance bus line 2. In this manner, the disconnection $B_2$ is bypassed via the overlapping region $W_7$, the first conductive layer 8, the pixel electrode 5, the second conductive layer 8 and the overlapping region $W_{15}$. It should be noted that the disconnection $B_2$ can be repaired as described above by directly connecting the auxiliary capacitance electrode 6 to the pixel electrode 5 without the use of the conductive layers 8.

Figure 5:
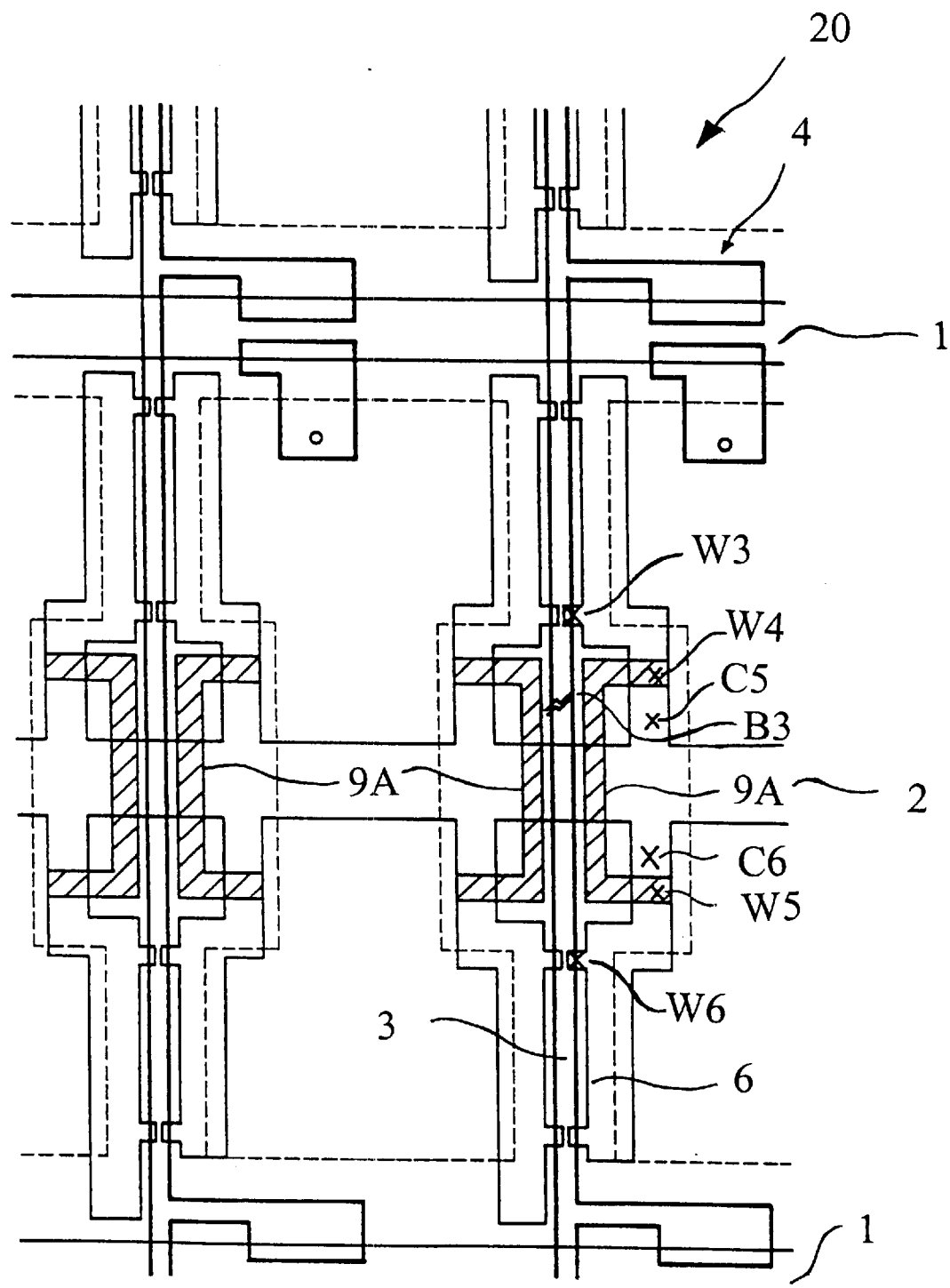
FIG. 5 is a plan view of the thin film transistor matrix substrate according to the third embodiment of the present invention.

Referring to FIG. 5, the TFT matrix substrate 20 according to the third embodiment of the present invention includes all the features described above respect to the first embodiment and shown in FIG. 1. In addition, auxiliary electrodes 9A (four shown in FIG. 5) are formed on the same layer as the drain electrode layer 3, i.e., the gate insulated layer 11. The auxiliary electrode 9A extends along the drain bus line 3 and has ends which overlap with the auxiliary capacitance electrode 6 on both sides of the accumulated capacitance bus line 2 at overlapping regions $W_4$ and $W_5$. Preferably, the auxiliary electrode 9A has a width of approximately 10 $\mu m$ and a thickness of about 150 nm, and is formed simultaneously with, and using the same formation method as, the drain bus line 3.

In accordance with a repair method of the invention, if a disconnection $B_3$ occurs on the drain bus line 3, a repair is made by connecting the drain bus line 3 to the auxiliary electrode 6 at the overlapping regions $W_3$, $W_6$ created by the protruded portions 6P, and connecting the auxiliary electrode 9A to the auxiliary capacitance electrode 6 where they overlap, at overlapping regions $W_4$ and $W_5$. In addition, two points $C_5$, $C_6$ on the auxiliary capacitance electrode 6 near the accumulated capacitance bus line 2 are cut to electrically disconnect the auxiliary capacitance electrode 6 from the accumulated bus line 2. In this, as in the other described embodiments of the present invention, the electrical connections and the cuts are preferably made by means of irradiation of a laser beam.

Figure 6:
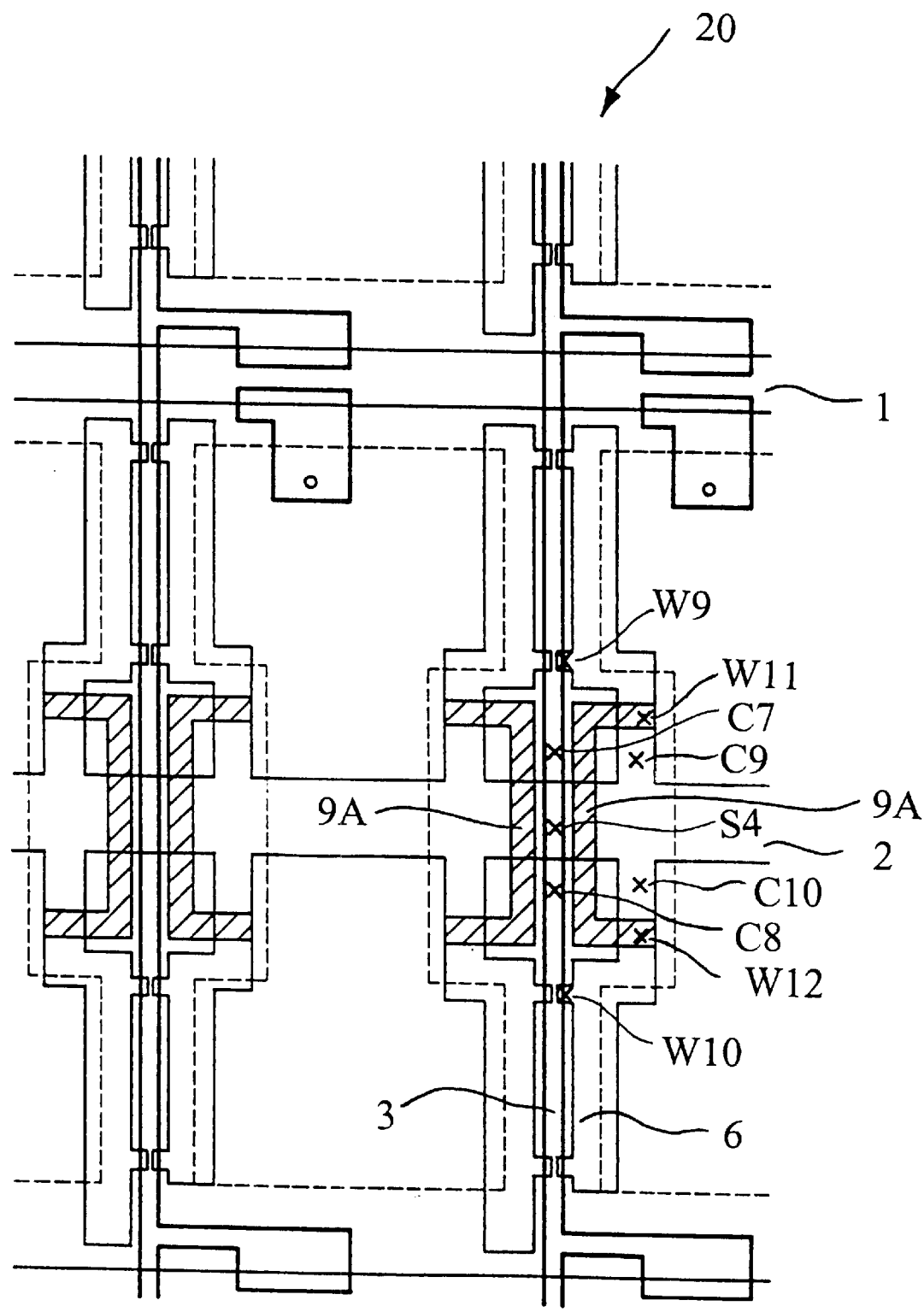
FIG. 6 is a diagram showing a method for repairing a short-circuit in the thin film transistor matrix substrate of FIG. 5.

Referring now to FIG. 6, a method is described for repairing a short-circuit in the TFT matrix substrate 20 shown in FIG. 5. If a short-circuit $S_4$ occurs between the accumulated capacitance bus line 2 and drain bus line 3 at the location where they cross, a repair can be made by cutting the drain bus line 3 at two points $C_7$, $C_8$ on both sides of the short $S_4$. The auxiliary capacitance electrode 6 is also cut at two points $C_9$, $C_{10}$ near the accumulated bus line 2, and the drain bus line 3 and auxiliary capacitance electrode 6 are electrically connected at the overlapping regions $W_9$, $W_{10}$. Further, the auxiliary electrode 9A and the auxiliary capacitance electrode 6 are also electrically connected at two overlapping regions $W_{11}$, $W_{12}$. In this manner, the short is electrically isolated from the rest of the matrix substrate 20 and bypassed via the auxiliary capacitance electrode 6 and the auxiliary electrode 9A.

Figure 7:
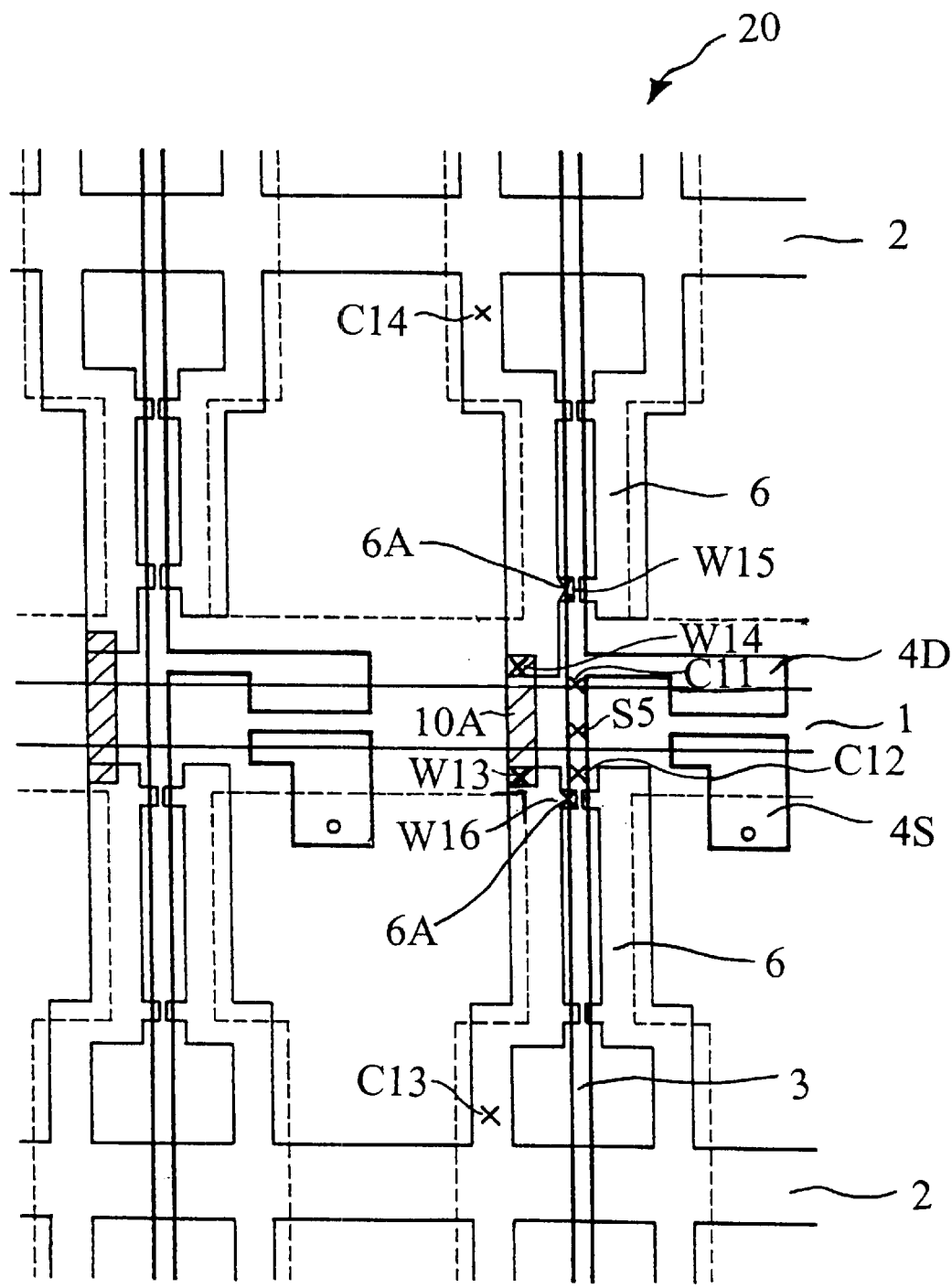
FIG. 7 is a plan view of the thin film transistor matrix substrate according to the fourth embodiment of the present invention.

FIG. 7 shows the TFT matrix substrate 20 according to the fourth embodiment of the present invention, including an auxiliary electrode 10A formed on the gate insulated layer film 11 (best seen in FIG. 2B). The auxiliary electrode 10A extends across the gate bus line 1 along the drain bus line 3 and has two ends which overlap with ends of two auxiliary capacitance electrodes 6 on both sides of the gate bus line to create two overlapping regions $W_{13}$, $W_{14}$. This embodiment also includes all the features described with respect to the first embodiment and shown in FIG. 1.

If a short-circuit $S_5$ occurs between the drain bus line 3 and the gate bus line 1, for example, a repair can be made in accordance with a repair method where the auxiliary electrode 10A and the two auxiliary capacitance electrodes 6 are electrically overlapped at the two overlapping regions $W_{13}$, $W_{14}$. The drain bus line 3 and auxiliary capacitance electrodes 6 are also electrically connected at two overlapping regions $W_{15}, W_{16}$, created by the protruded portions 6A of two auxiliary capacitance electrodes 6. Further, cuts are made on the drain bus line 3 at two points $C_{11}, C_{12}$ between the overlapping regions $W_{15}, W_{16}$ on both sides of the short $S_5$. Finally, the two auxiliary capacitance electrodes 6 are cut at points $C_{13}, C_{14}$ near their respective accumulated capacitance bus lines 2. As such, the short is electrically isolated from the rest of the TFT matrix substrate 20 and bypassed via the auxiliary electrode 10B and two auxiliary capacitance electrodes 6.

Figure 8A:
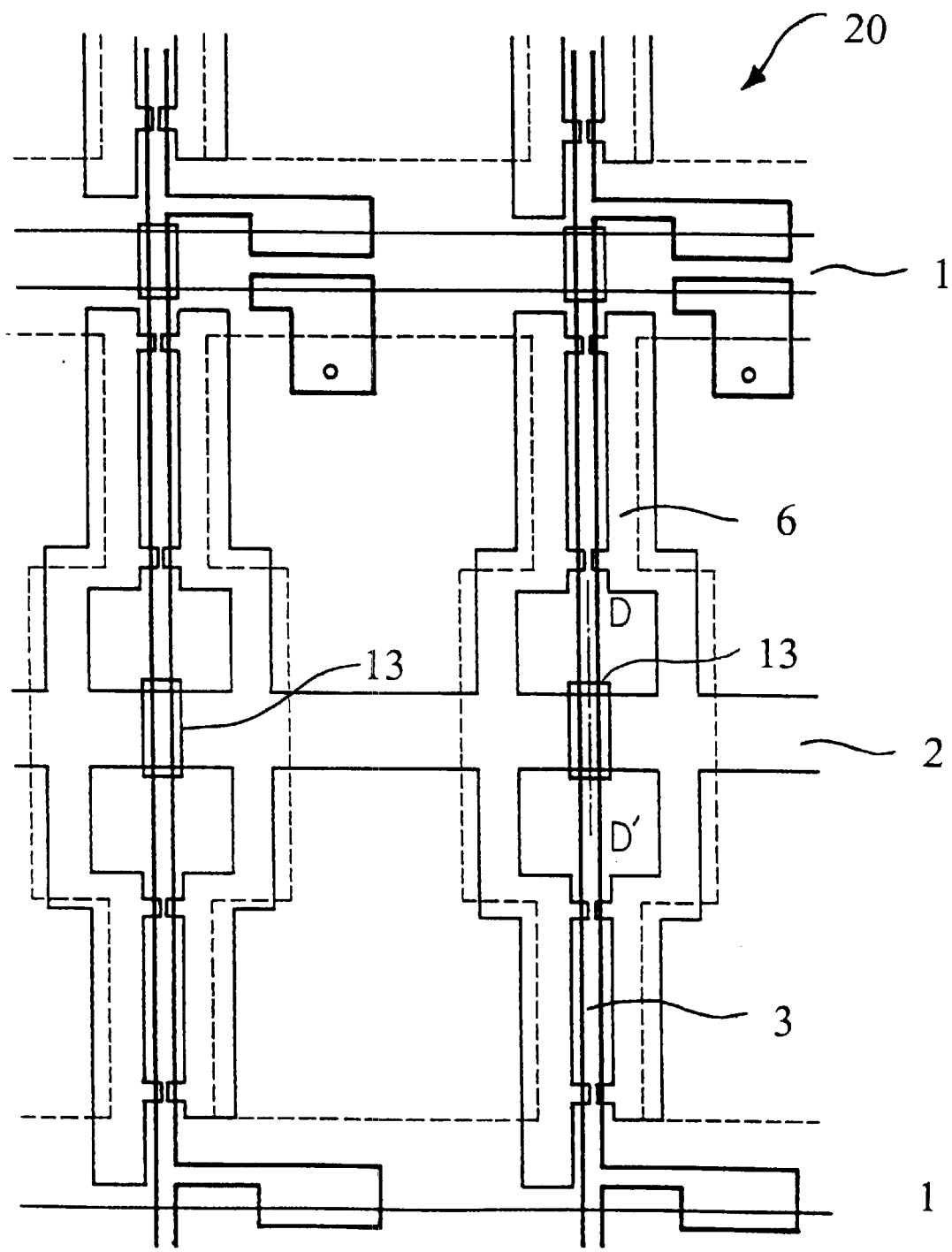
FIG. 8A is a plan view of the thin film transistor matrix substrate according to the fifth embodiment of the present invention.
Figure 8B:
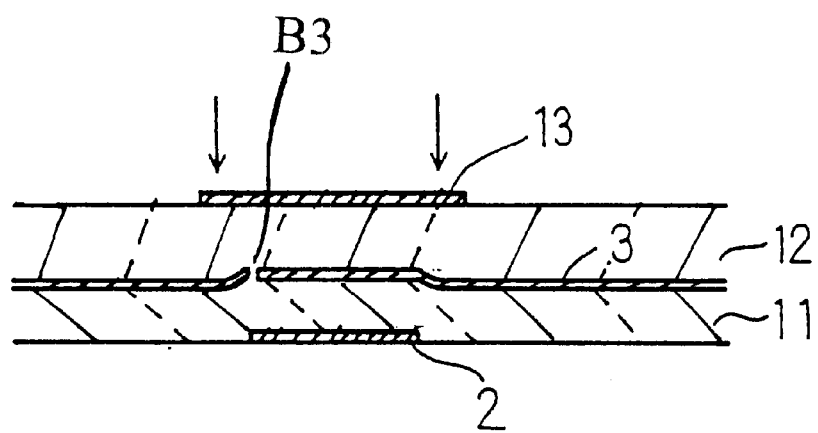
FIG. 8B is a cross-section of line D—D of FIG. 8A.

As shown in FIGS. 8A and 8B, the TFT matrix substrate 20 according to the fifth embodiment of the present invention includes all the features described in the first embodiment and shown in FIG. 1. In addition, a conductive layer 13 is formed in the regions where the drain bus line 3 crosses the accumulated capacitance and the gate bus lines 2,1. FIG. 8B is a sectional view along line D–D' of FIG. 8A, and shows that the conductive layer 13 is formed on the surface of the interlayer insulated film 12. The conductive layer 13 consists preferably of indium tin oxide (ITO), and is formed, for example, by depositing an ITO film by sputtering and then patterning.

As shown in FIG. 8B, the portion of the drain bus line 3 that crosses the accumulated capacitance bus line 2 is prone to breakage due to the existence of a stepped area created by the accumulated capacitance bus line 2. In the event that a disconnection $B_3$ occurs on the drain bus line 3, a repair is made by electrically connecting the conductive layer 13 to the drain bus line at both sides of the disconnection (portions indicated by the arrow marks), thereby bypassing the disconnection.

Figure 9:
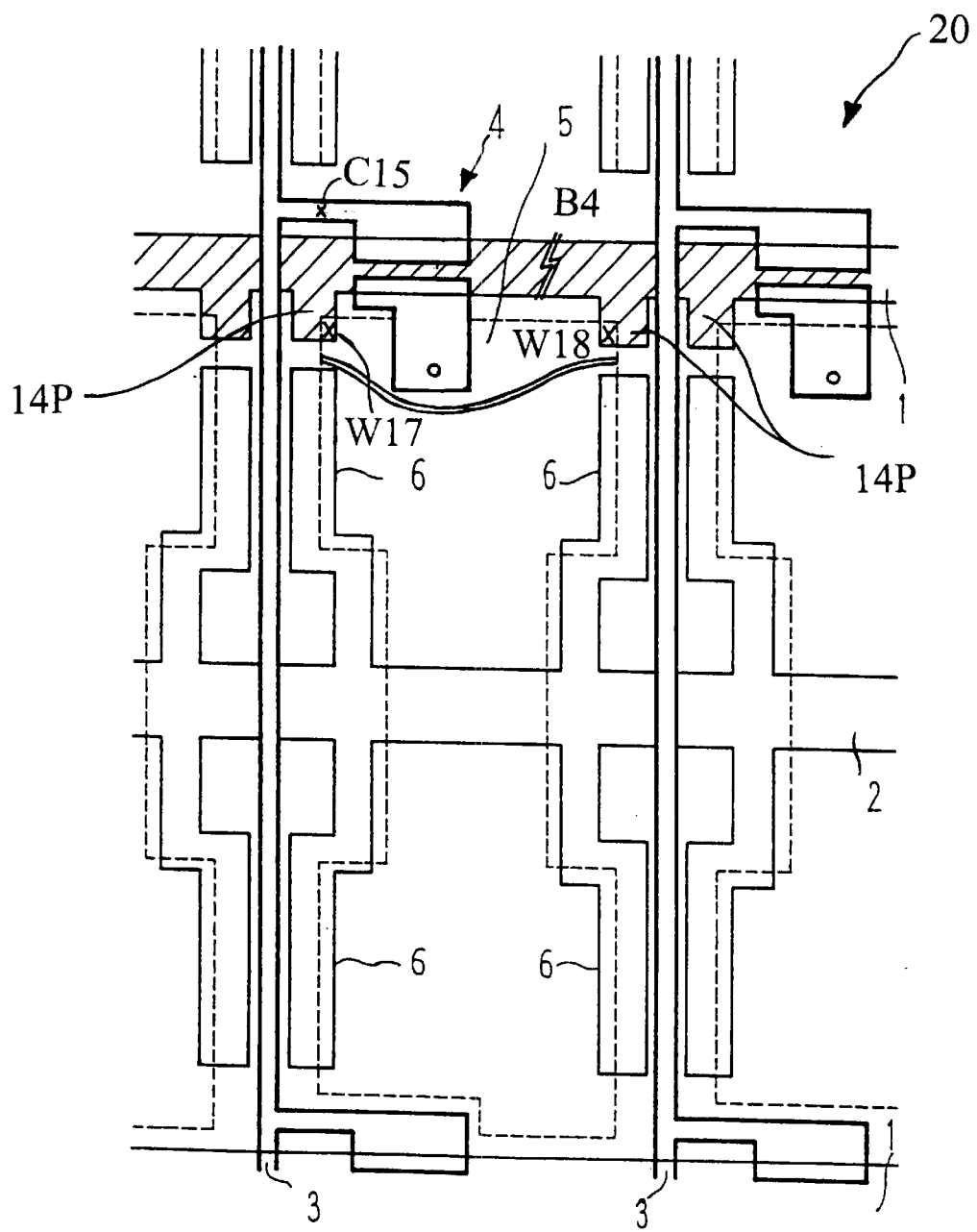
FIG. 9 is a plan view of the thin film transistor matrix substrate according to the sixth embodiment of the present invention.

Referring to FIG. 9, the TFT matrix substrate 20 in accordance with the sixth embodiment of the present invention includes substantially all the features described with respect to the first embodiment and shown in FIG. 1, with the exception of the protruded portions 6A on the auxiliary capacitance electrodes 6. In addition, the TFT matrix substrate 20 of this embodiment includes the gate bus lines 101 having portions 14P that protrude from the gate bus lines 101 and overlap with, two corners of each pixel electrode 5 to create two overlapping regions $W_{17}, W_{18}$.

If a disconnection $B_4$ occurs on the gate bus line 1 between the two protruded portions 14P, for example, a repair is made by irradiating the overlapping regions $W_{17}, W_{18}$ with a laser beam to electrically connect the two protruded portions with the pixel electrode 5. Additionally, the drain electrode 4D is cut at point $C_{15}$ near the drain bus line 3, and a transparent conductive film of the pixel electrode 5 is cut across its entire width (shown in solid double line) with a laser beam to eliminate the influence of the corresponding TFT 4.

Figure 10:
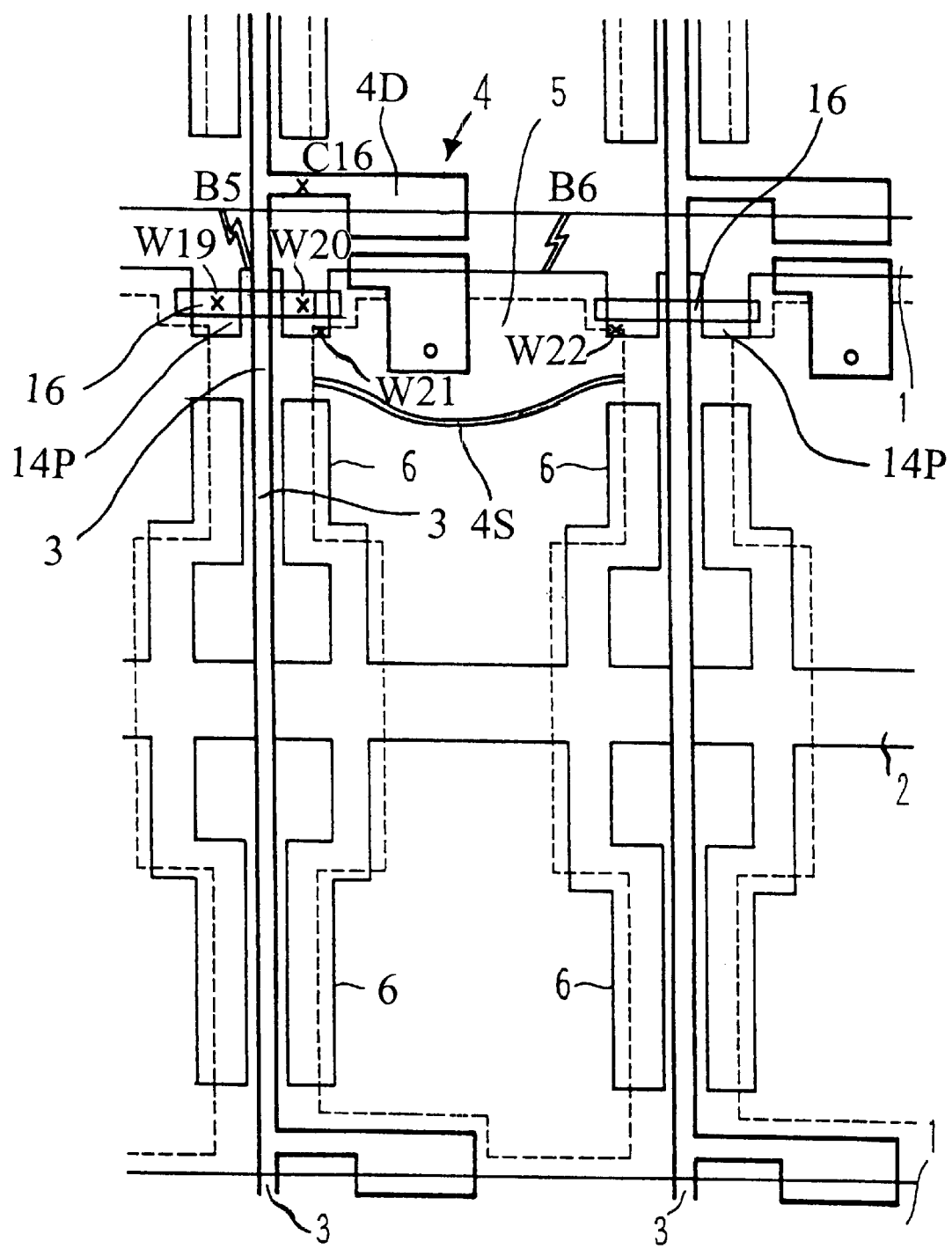
FIG. 10 is a plan view of the thin film transistor matrix substrate according to the seventh embodiment of the present invention.

Referring now to FIG. 10, the TFT matrix substrate 20 in accordance with the seventh embodiment of the present invention includes all the features of the sixth embodiment described above and shown in reference to FIG. 9. In addition, a conductive film 16 is formed on the interlayer insulated film 12 and extends across the drain bus line 3 so that its ends overlap with two adjacent protruded portions 14P on either sides of the drain bus line 3 to create two overlapping regions $W_{19}, W_{20}$.

If a disconnection $B_5$ occurs between the two overlapping regions $W_{19}, W_{20}$, the protruded portions 14P and the conductive film 16 are electrically connected, thereby creating a bypass around the disconnection $B_5$. In the event of two disconnections $B_5$ and $B_6$ occurring on the same gate bus line 1 as shown in FIG. 10, a repair can be made by combining the method described above for repairing the disconnection $B_4$ shown in FIG. 9 and the method for repairing the disconnection $B_5$ shown in FIG. 10.

Figure 11:
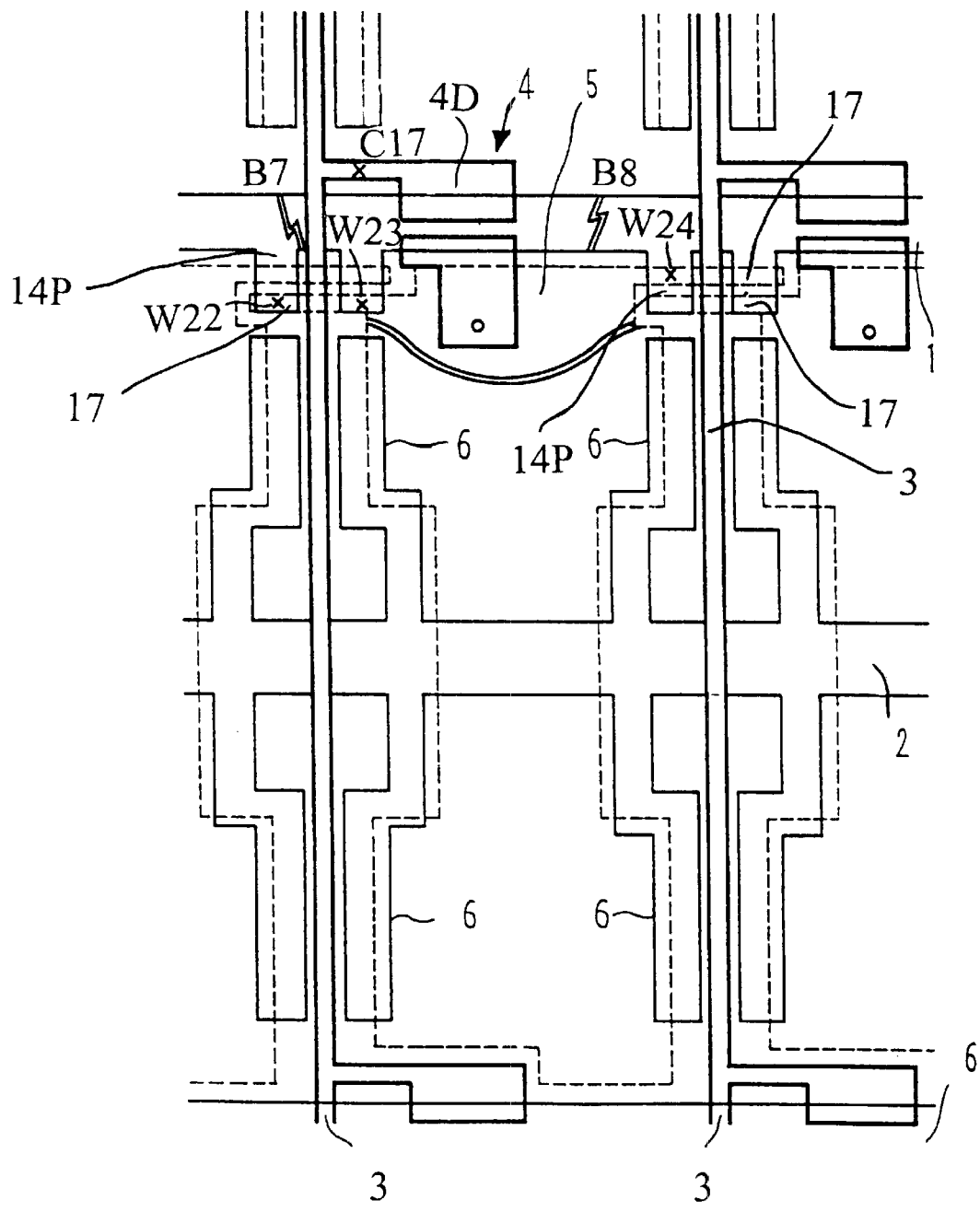
FIG. 11 is a plan view of the thin film transistor matrix substrate according to the eighth embodiment of the present invention.

As shown in FIG. 11, the TFT matrix substrate 20 according to the eighth embodiment of the invention includes all the features of the sixth embodiment as described above and shown in FIG. 9. In addition, each of the pixel electrodes 5 is configured so that the top two corners have elongated extensions 17 that extend parallel with the gate bus line 1 and cross their respective adjacent drain bus line 3 on both sides of the pixel electrode. Each extension 17 overlaps with two adjacent protruded portions 14P on either sides of the drain bus lines 3.

If disconnections $B_7$ and $B_8$ occur on the gate bus line 1, for example, a repair can be made by irradiating overlapping regions $W_{22}, W_{23}, W_{24}$ with a laser beam to electrically connect the protruded portions 14P with the pixel electrode 5. It should be understood that this repair method requires one less number of laser irradiations than that of the seventh embodiment described with reference to FIG. 10. The drain electrode 4D at point $C_{17}$ and the transparent conductive film of the pixel electrode 5 are also cut by a laser beam in this case, as in the methods described above with respect to the embodiments of FIGS. 9 and 10.

Figure 12:
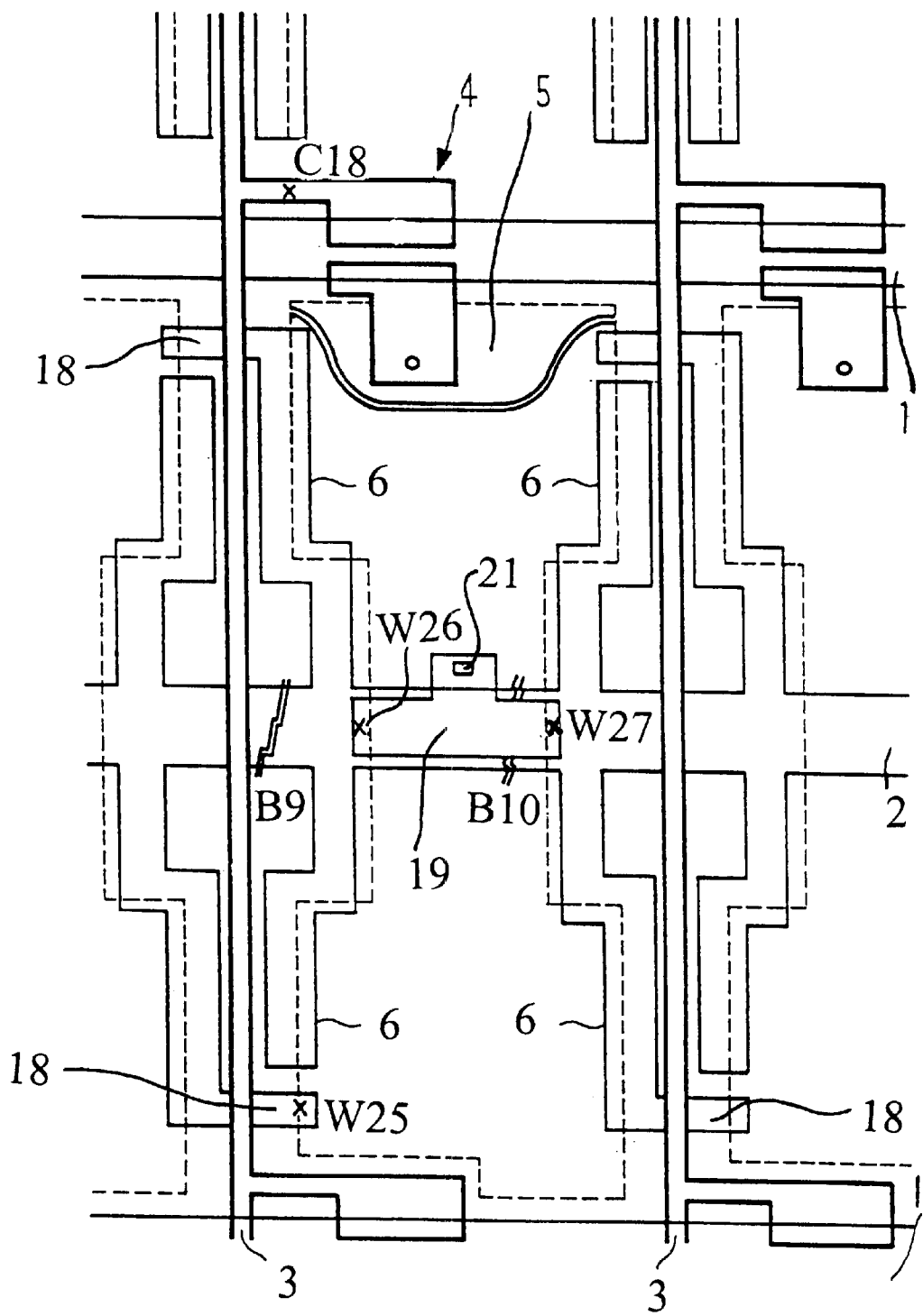
FIG. 12 is a plan view of the thin film transistor matrix substrate according to the ninth embodiment of the present invention.

FIG. 12 shows the TFT matrix substrate 20 according to the ninth embodiment which has the basic configuration of the first embodiment described above and shown with reference to FIG. 1, with the exception of the protruded parts 6P. As seen in FIG. 12, in this embodiment, each auxiliary capacitance electrode 6 has one elongated end portion 18 which extends across one of the drain bus lines 3 and overlaps with one of the pixel electrodes 5 which is between the same drain bus line crossed by the end portion 18 and another drain bus line. In the preferred embodiment, as shown in FIG. 12, the end 18 of a pair of auxiliary capacitance electrodes between a pair of drain bus lines 3 are at opposite sides from each other.

Also, a conductive film 19 is provided on the gate insulated film 11 and overlapping with the accumulated capacitance electrode 2 between a pair of auxiliary capacitance electrodes which themselves are between a pair of drain bus lines 3. The conductive film 19 is electrically connected to its corresponding pixel electrode 5 via an opening 21 through the interlayer insulated film 12.

If a disconnection $B_9$ occurs on the accumulated capacitance bus line 2 near the drain bus line 3, the disconnection can be repaired in this embodiment by electrically connecting the end portion 18, extending across the drain bus line 3 from the other side of the drain bus line 3, to the pixel electrode 6, which is connected to the conductive film 19, at an overlapping region $W_{25}$ where they overlap. Then, the conductive film 19 is electrically connected to the accumulated capacitance electrode 2 where they overlap, for example, at overlapping region $W_{26}$. Additionally, the drain electrode 4D is cut at point $C_{18}$ near the drain bus line 3, and the transparent conductive film of the pixel electrode 5 is cut across its entire width (shown in solid double line) with a laser beam to eliminate the influence of the corresponding TFT 4.

Moreover, if a disconnection $B_{10}$ occurs on the accumulated capacitance bus line 2 in the area where the conductive film 19 is overlapped, it can be repaired by electrically connecting the conductive film to the accumulated capacitance bus line at overlapping regions $W_{26}, W_{27}$ on either sides of the disconnection. The drain electrode 4D at point $C_{18}$ and the pixel electrode 5 across its entire width are also cut. If disconnection $B_9$ is also detected, an additional connection is made at overlapping region $W_{25}$, as described above.

Figure 13:
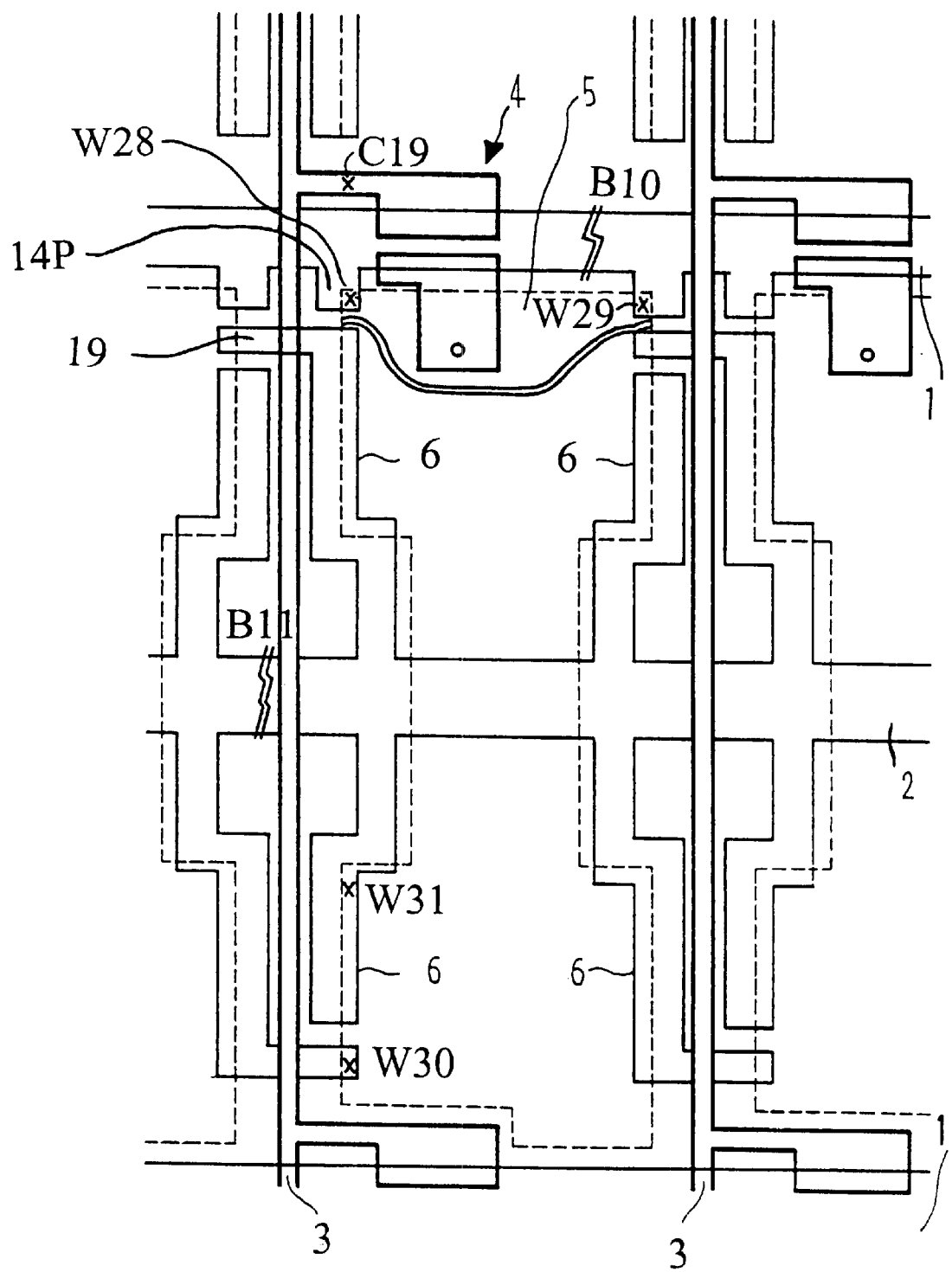
FIG. 13 is a plan view of the thin film transistor matrix substrate according to the tenth embodiment of the present invention.

As seen in FIG. 13, the TFT matrix substrate 20 in accordance with the tenth embodiment of the present invention combines the sixth and the ninth embodiments of the present invention as described above and shown in FIGS. 9 and 12, respectively, without the conductive film 19. Having such arrangement, the matrix substrate 20 is adapted for repairing disconnections that may occur on the gate bus lines 1 and/or the accumulated capacitance bus lines 2.

For example, if disconnections $B_{10}$ and $B_{11}$ occur respectively on the gate and the accumulated capacitance bus lines, overlapping regions $W_{30}$, $W_{31}$ of the auxiliary capacitance electrode 6 and pixel electrode 5, and overlapping regions $W_{28}$, $W_{29}$ of the protruded portion 14P of the gate bus line 1 and the pixel electrode 5 are electrically connected. The drain electrode 4D at point $C_{19}$ is cut by a laser beam to isolate it from the drain bus line 3, and the pixel electrode 5 is also cut by a laser beam to eliminate the influence of the TFT 4.

While not shown, it should be understood that other combinations of the above-described embodiments can also be made, for example, combinations of the seventh and the ninth embodiments, or the eighth and the ninth embodiments.

It should also be understood that it is possible to repair the interlayer short-circuits or disconnections of the drain bus lines using the repair methods used for repairing the disconnections and short-circuits of the gate bus lines with minor variations.

It will be appreciated that the notable advantage of the present invention is that the total manufacturing yield of TFT matrix substrate devices is significantly improved, because a fault may be repaired within the matrix substrate using relatively simple methods.

While the principles of the invention has been described above in connection with specific apparatus and applications, it is to be understood that these description is made only by way of example and not as limitation on the scope of the invention.

What is claimed is:

1. An integrated thin film transistor substrate comprising:
   an insulated substrate;
   a plurality of parallel gate bus lines and a plurality of accumulated capacitance bus lines formed on said insulated substrate, each of said accumulated bus lines extending parallel to and between a pair of said gate bus lines;
   a plurality of auxiliary capacitance electrodes extending from said accumulated capacitance bus lines;
   a first insulated film provided on said gate and accumulated capacitance bus lines and said auxiliary capacitance electrodes;
   a plurality of thin film transistors, each of said gate bus lines electrically connecting at least two of said thin film transistors;
   a plurality of parallel drain bus lines provided substantially perpendicular to said gate and accumulated capacitance bus lines on said first insulated film, each of said drain bus lines electrically connecting at least two of said thin film transistors;
   a second insulated film provided on said thin film transistors and said drain bus lines, said second insulated film having an opening over each of said thin film transistors;
   a plurality of pixel electrodes provided on said second insulated film, each of said pixel electrodes being electrically connected to a corresponding one of said transistors via said opening; and
   at least one conductive layer formed on said second insulated film at first and second crossing regions where said drain bus lines cross said gate and said accumulated capacitance bus lines respectively.

2. The thin film transistor matrix substrate according to claim 1, wherein two ends of said conductive film are electrically connected to a corresponding one of said drain bus lines via irradiation of a laser beam when a disconnection occurs on said corresponding drain bus line in either of said first and second crossing regions.

3. An integrated thin film transistor matrix substrate comprising:
   an insulated substrate;
   a plurality of parallel gate bus lines and a plurality of accumulated capacitance bus lines formed on said insulated substrate, each of said accumulated bus lines extending parallel to and between a pair of said gate bus lines;
   a plurality of auxiliary capacitance electrodes extending from said accumulated capacitance bus lines;
   a first insulated film provided on said gate and accumulated capacitance bus lines and said auxiliary capacitance electrodes;
   a plurality of thin film transistors, each of said gate bus lines electrically connecting at least two of said tin film transistors;
   a plurality of parallel drain bus lines provided substantially perpendicular to said gate and accumulated capacitance bus lines on said first insulated film, each of said drain bus lines electrically connecting at least two of said thin film transistors;
   a second insulated film provided on said thin film transistors and said drain bus lines, said second insulated film have an opening over each of said thin film transistors; and
   a plurality of pixel electrodes provided on said second insulated film, each of said pixel electrodes being provided between a pair of said drain bus lines and electrically connected to a corresponding one of said transistors via said opening;
   wherein one end of at least one of said plurality of auxiliary capacitance electrodes extends across one of said drain bus lines and overlaps with a portion of a selected adjacent pixel electrode to create a first overlapping region.

4. The thin film transistor matrix substrate according to claim 3, wherein at least said one end and said portion of said adjacent pixel electrode of said first overlapping region are electrically connected via irradiation of a laser beam when a disconnection occurs on a corresponding one of said accumulated capacitance bus lines between said auxiliary capacitance electrodes and said selected adjacent pixel electrode.

5. The integrated thin film transistor matrix substrate according to claim 3, further including at least one conductive film formed on said first insulated film between two of said drain bus lines corresponding to said selected adjacent pixel electrode, said conductive film overlapping with a corresponding one of said accumulated capacitance electrodes and configured to have two ends which extend beyond a width of said selected adjacent pixel electrode, wherein said conductive film is electrically connected to said selected adjacent pixel electrode through said second insulated film.

6. The thin film transistor matrix substrate according to claim 5, wherein said two ends of said conductive film are irradiated with a laser beam to electrically connect said conductive film to said corresponding accumulated capacitance electrodes when a disconnection occurs on said corresponding accumulated capacitance electrode between said two ends.

* * * * *